United States Patent [19]
Haley

[11] Patent Number: 5,524,423
[45] Date of Patent: Jun. 11, 1996

[54] COMPOSTING AND LEAF COLLECTION KIT AND METHOD

[76] Inventor: Reginald J. Haley, 1030 Cumberland Ct., Waldorf, Md. 20601

[21] Appl. No.: 273,851

[22] Filed: Jul. 12, 1994

[51] Int. Cl.[6] .......................... B65B 11/00; B65D 65/46; B65D 63/10; E04H 15/62
[52] U.S. Cl. ........................................ 56/1; 56/329; 383/1
[58] Field of Search .............................. 56/329, 1, 328.1, 56/202; 47/1, 9, 31, 58; 256/1; 383/1, 4

[56] References Cited

U.S. PATENT DOCUMENTS

| | | | |
|---|---|---|---|
| 3,315,408 | 4/1967 | Fisher | 47/9 |
| 3,384,993 | 5/1968 | Kane | 47/58 |
| 3,490,216 | 1/1970 | Gonzalez | 56/329 |
| 3,524,310 | 8/1970 | Petersen | 56/328.1 |
| 3,616,629 | 11/1971 | Ooka | 56/329 |
| 3,704,544 | 12/1972 | Spanel et al. | 47/9 |
| 4,058,956 | 11/1977 | Skonieczny | 56/1 |
| 4,200,127 | 4/1980 | Dunleavy | 56/1 X |
| 4,296,788 | 10/1981 | Slater . | |
| 4,366,949 | 1/1983 | Staub, Sr. | 256/1 |
| 4,377,919 | 3/1983 | Gams | 47/9 X |
| 4,602,664 | 7/1986 | Hullen | 56/1 X |
| 4,738,477 | 4/1988 | Grossmeyer | 56/329 X |
| 5,070,643 | 12/1991 | Hinsperger | 47/31 |

*Primary Examiner*—Stephen J. Novosad
*Attorney, Agent, or Firm*—Wigman, Cohen, Leitner & Myers

[57] ABSTRACT

A kit and method for removing fallen leaves and other yard waste, composting the leaves, and applying a fertilizer and/or dethatching agent to the ground is disclosed. The kit generally comprises fabric net impregnated with a fertilizer and/or dethatching material, a bag, impregnated with a composting promoting material, which receives the rolled net, and a plurality of special spikes, adapted to hold the net to the ground.

14 Claims, 2 Drawing Sheets

5,524,423

COMPOSTING AND LEAF COLLECTION KIT AND METHOD

FIELD OF THE INVENTION

The present invention relates to harvesters and composting apparatus and more particularly to a method and kit which allows collection of leaves and the composting thereof along with the fertilization and dethatching of the underlying lawn.

BACKGROUND OF THE INVENTION

The process of composting, wherein organic waste such as fallen leaves, grass clippings, and wet garbage are converted by microorganisms into useful fertilizer or ground filler, has been practiced for many years. Recently, however, municipalities have stepped-up their efforts to encourage composting in an effort to preserve decreasing landfill space. In a typical suburban jurisdiction, yard waste makes up about 20% of landfill space. As a result, many jurisdictions are recognizing the importance of reducing the quantity of yard waste sent to landfills. For example, in Montgomery County, Md. governmental authorities are encouraging homeowners to keep yard waste on their lawns to preserve landfill space and also prevent increased use of that county's composting facilities which are overused. In some parts of South Dakota, Oregon, and Maine disposal of yard wastes in landfills is prohibited. Unfortunately, the general public has heretofore not embraced composting to a sufficient extent to adequately preserve valuable landfill space. The public remains reluctant to adopt composting as an alternative to raking, bagging, and disposing of their leaves and grass as municipal solid waste. There are several reasons for this reluctance. First, most people, in particular suburbanites, are entirely unfamiliar with the composting process as compared to their rural counterparts. Second, many suburbanites are reluctant to place composting apparatus on their property, believing it to be unattractive or foul smelling. Third, and perhaps most important, most people find the task of composting to be time consuming, burdensome and unproductive. A search of the prior art reveals patents disclosing various devices which are stated to be useful for composting. For example, U.S. Pat. No. 5,178,469 to Pinder discloses an aerobic composting apparatus which employs a rigid container. U.S. Pat. No. 5,178,469 to Collinson discloses a biodegradable container for composting, inter alia, yard waste such as grass clippings. U.S. Pat. No. 5,111,933 to DiBiasi et al. discloses a kit providing a thermally degradable compost bag. Additionally, there is known in the art methods for leaf and yard waste removal comprising nets and the like. U.S. Pat. No. 4,366,949 to Staub discloses a netting for catching and collecting leaves. There is also known in the art a fibrous material having fertilizer disposed with the yarns thereof, as is disclosed in U.S. Pat. No. 3,315,408 to Fisher. There has not, however, been a method or kit which provides an efficient means to simultaneously perform the four functions of yard waste removal, composting, fertilization, and dethatching and thereby encouraging its use by consumers.

In view of the foregoing, there is a great need for a method and apparatus for the composting of leaves, grass clippings and the like which is easy and time-saving and which also serves other functions to an extent that consumers would be motivated to practice composting as an alternative to conventional disposal practices.

SUMMARY OF THE INVENTION

The present invention is directed to a composting method and apparatus which performs the following four functions: First, it provides a means for removing fallen leaves, grass clippings and the like which is easier and less time consuming than conventional raking and bagging. Second, it offers a means for composting yard waste, thereby preserving valuable landfill space and creating a useful fertilizer and soil conditioner. Third and fourth, the present invention provides a means for applying fertilizer and/or a dethatching agent to a lawn in a manner which is less burdensome than conventional application techniques.

In summary, the present invention comprises a plurality of fabric nets which are placed on a lawn before leaves have fallen. The nets are spread out and anchored to the lawn by means of "crown" spikes, the structures of which are described in detail below, which are driven into the ground by a hand-held applicator specifically designed for this purpose. The nets are pre-treated or coated with a fertilizer and/or dethatching agent which is capable of being absorbed into the underlying ground over time. Additionally, the netting is made of a biodegradable material so that it will decompose within about twelve months. The netting material may be made of a cellulosic fibrous webbing or yarns. After leaves have fallen the net may be rolled to a tube-like spiral configuration so as to capture and contain the yard waste. The rolled nets are then placed into bags impregnated with a chemical catalyst known to facilitate composting by converting the yard waste into a humus rich material. All of the above-mentioned items can be collected and stored in a compact package which is ideal for sale, transport, and storage.

With the foregoing and other objects, advantages and features of the invention that will become hereinafter apparent, the nature of the invention may be more clearly understood by reference to the following detailed description of the invention, the appended claims and to the several views illustrated in the attached drawings.

DETAILED DESCRIPTION OF THE INVENTION

Figure 1:
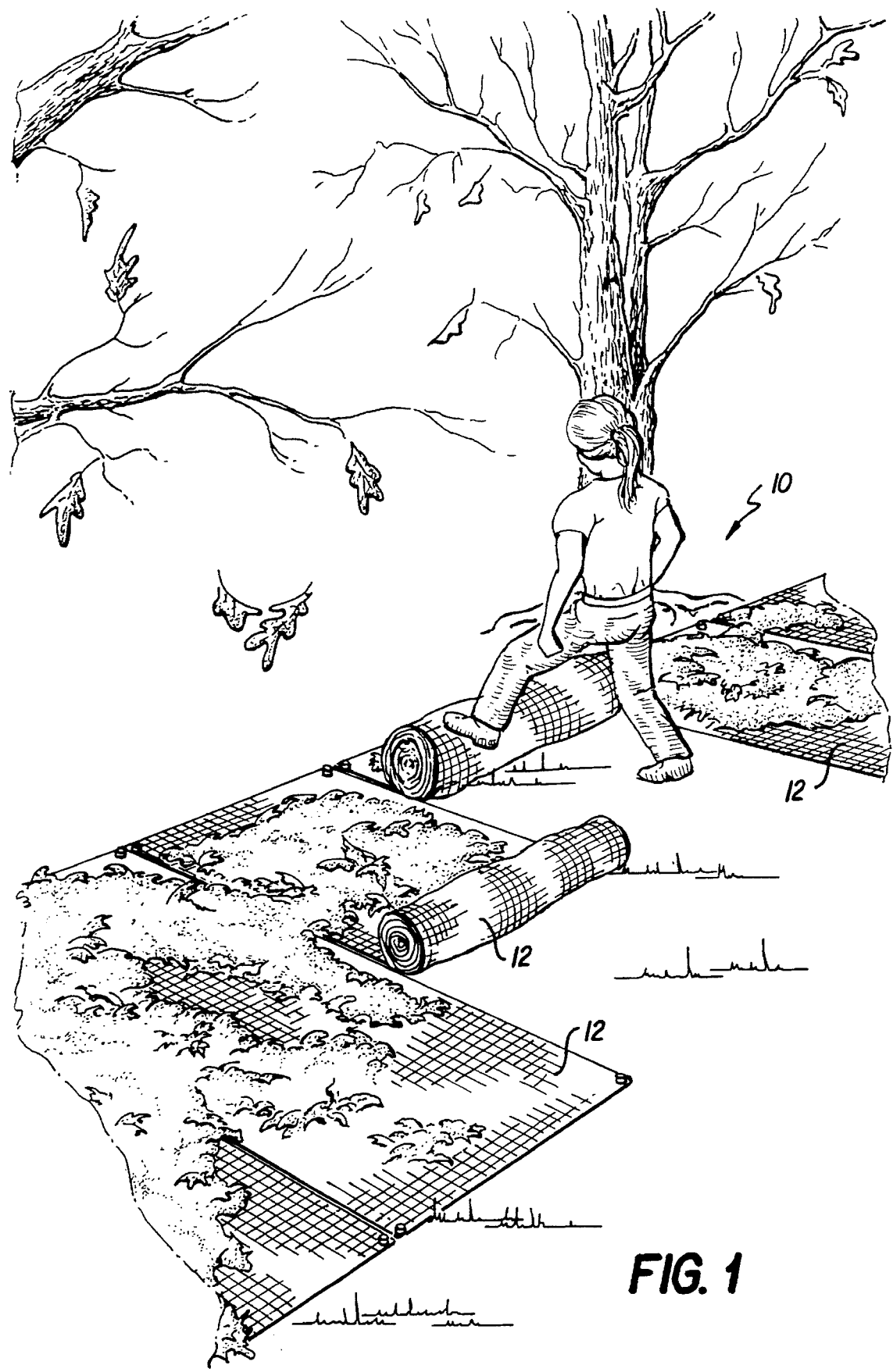
FIG. 1 is an environmental view of the apparatus and method of the present invention in use and operation.
Figure 2:
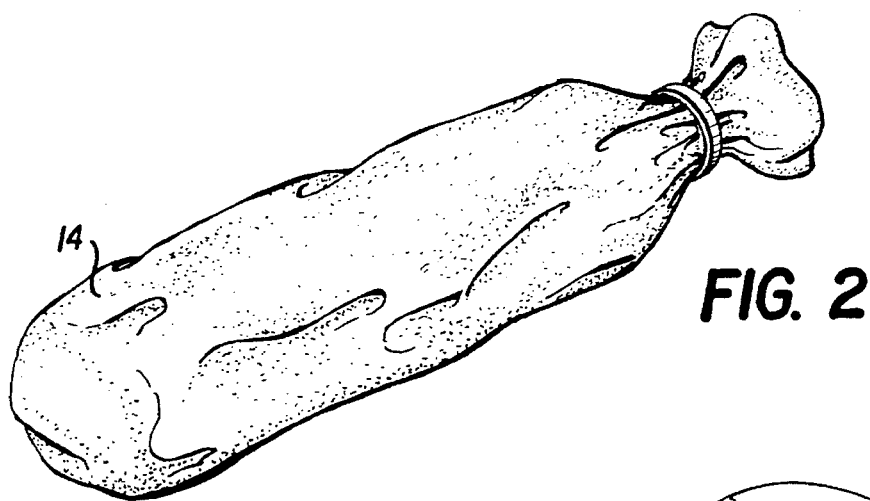
FIG. 2 is a perspective view of the composting bag of the present invention having the rolled net of the present invention disposed within.
Figure 3:
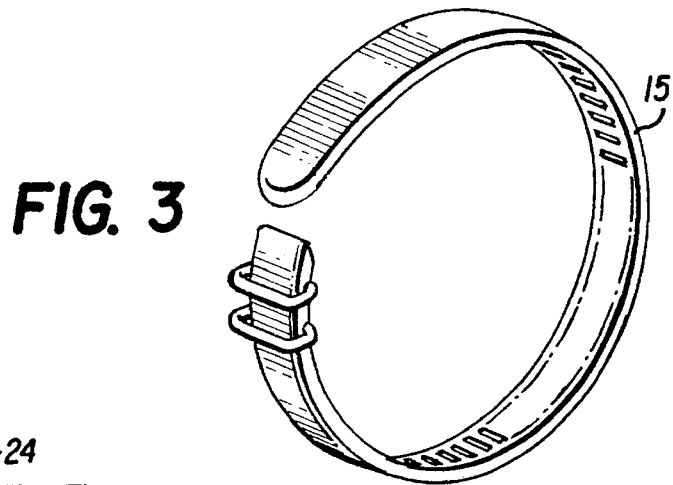
FIG. 3 is a perspective view of the composting band of the present invention.

Referring now in detail to the drawings wherein like parts are designated by like reference numerals throughout, there is illustrated in FIG. 1 an environmental view of the present invention designated generally by reference numeral 10.

In short, the present invention is directed to a kit 10 generally comprising the following elements: at least one fabric net 12 impregnated with a fertilizer and/or dethatching material described below, a bag 14 impregnated with a composting promoting material also described below, a spike applicator 16, and a plurality of spikes 18. The primary and secondary functions of the kit are composting and leaf collection respectively and the tertiary and quaternary functions are fertilization and dethatching of the lawn.

More particularly, net 12 is constructed of a four foot wide biodegradable material such as jute. Furthermore, the material employed in the construction of net 12 is impregnated with a chemical fertilizer such as the Natural Organic Fertilizer 3-4-3 available from Frank's Nursery & Crafts, Agri-Cycle, Inc. of Detroit, Mich. and/or a dethatching agent such as the "Thatch Master" brand agent availably from Faultless Starch-Bon AMICO of Kansas City, Mo. This allows the composting and leaf collection kit 10 to perform a tertiary and quaternary function of fertilization and dethatching of the lawn, in addition to its primary and secondary functions of leaf collection and composting. Net 12 has a preferred width of four feet and a preferred length of twenty-five feet, although other dimensions can be used. These dimensions allow the net 12 to be rolled and maneuvered with minimal effort. The net openings are preferably about three-fourths of an inch wide.

Composting bag 14 is constructed of jute, a material which is suitable for the absorption, retention, and controllable release of an appropriate composting agent. Examples of composting agents which may be employed are BIO-CHARGE CONCENTRATED COMPOST MAKER or RECYCLE COMPOST PLUS, both manufactured by the Ringer Corp. of Minneapolis, Minn., In lieu of composing bag 14, a band 15 made of jute, also impregnated with a suitable composting agent may be employed.

Figure 4:
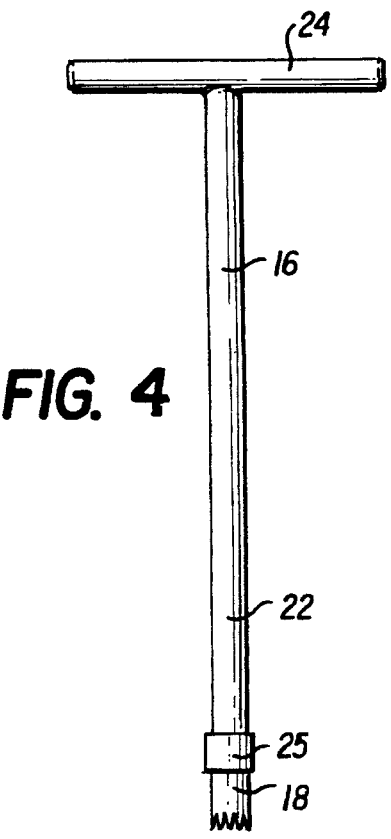
FIG. 4 is a side elevation view of the spike applicator of the present invention.
Figure 5:
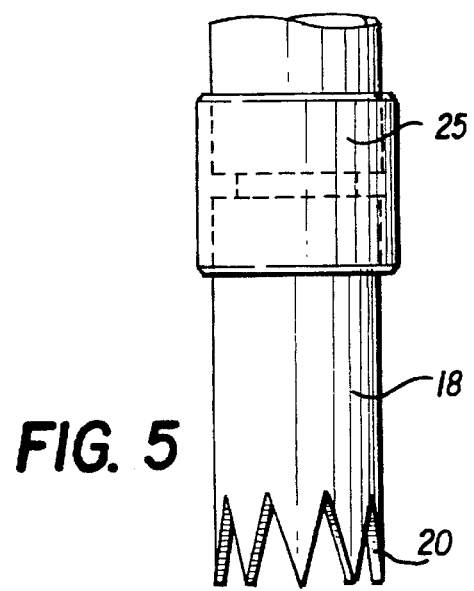
FIG. 5 is an enlarged elevation view of the "crown" spike of the present invention.

Spike applicator 16 (FIG. 4) is preferably comprised of PVC pipe or the like and comprises a shank portion 22, and a handle portion 24 mounted at a right angle thereto. At the lower end of shank 22 a collar 25 is mounted, the collar being adapted to removably receive one of a plurality of spikes 18 (FIG. 5). Spikes 18, also comprised of PVC pipe, are configured as a "kings crown", i.e. with serations 20 adapted to engage, but not puncture net 12, and hold it to the ground.

In use and operation, the above components are stored in bag 14 until they are to be employed. Nets 12 are unrolled and laid across a lawn, preferably in late summer or early fall. The nets 12 are secured to the ground by means of spikes 18 which are driven into the ground by spike applicator 16. In particular, the teeth 28 of spike 18 engage the strands of net 12 as they impale the ground. The nets remain on the ground for several weeks thereby fertilizing and/or dethatching the underlying lawn by releasing the organic fertilizer or dethatching agent. After leaves and other yard waste have fallen upon nets 12, they are rolled in the manner illustrated in FIG. 1. The rolled nets having the yard waste captured therein are then deposited in bag 14. Alternatively a plurality of bands 15 may be employed to circumscribe the rolled nets 12. The above-described composting catalyst, which impregnates both bag 14 and band 15, will hasten the composting of the yard waste. The compost can then be returned to the soil as a natural fertilizer.

In summary, the above-described kit and method provides means for removing fallen leaves and other yard waste, means for composting the leaves, and a means for applying a fertilizer and/or dethatching agent to the lawn. The first step of this procedure is rolling-out the described net over the lawn, in early Fall, to fertilize/dethatch the lawn and catch the falling leaves. The second step is rolling up the net, with the contained leaves, in early Spring for compost. The described biodegradable nets, bands, and bags also decompose creating a humus rich compost. The result of this two-step procedure improves the quality of the environment by reducing pollution, conserving landfill space, and creating valuable soil conditioners and fertilizers.

Although certain presently preferred embodiments of the invention have been described herein, it will be apparent to those skilled in the art to which the invention pertains that variations and modifications of the described embodiment may be made without departing from the spirit and scope of the invention. Accordingly, it is intended that the invention be limited only to the extent required by the appended claims and the applicable rules of law.

What is claimed is:

1. A kit of parts useful for the removal and disposal of organic waste from a lawn comprising:
   a net adapted to cover the lawn and receive the waste;
   a container for receiving said net having said waste contained therein said container being impregnated with a composting agent for converting said organic waste into fertilizer and soil conditioner within said container.

2. The kit of claim 1, said net being impregnated with a fertilizer.

3. The kit of claim 1, said net being impregnated with a dethatching agent.

4. The kit of claim 1, said net being biodegradable.

5. The kit according to claim 1, further including a stake comprising saw-tooth projections at one end thereof for securing said net to the law.

6. The kit according to claim 5, further including a stake driver.

7. The kit according to claim 6, wherein said net is impregnated with a dethatching agent.

8. The kit according to claim 5, wherein said net is impregnated with a dethatching agent.

9. A kit according to claim 1, wherein said net is impregnated with a dethatching agent.

10. A kit of parts useful for the removal and disposal of organic waste from a lawn comprising:
    a net adapted to cover the lawn and receive the waste; and,
    a stake comprising saw-tooth protrusions at one end thereof for securing said net to the lawn.

11. A kit of parts useful for the removal and disposal of organic waste from a lawn comprising:
    a net adapted to cover the lawn and receive the waste;
    a stake for securing said net to the lawn; and
    a stake driver for driving said stake into the ground, said driver having a top end defining a handle and a bottom end adapted to mate with said at least one stake.

12. A method of removing leaves from a lawn comprising the steps of:
    providing a net,
    providing a composting agent,
    providing a plurality of spikes,
    laying said net on the lawn,
    anchoring said net to said lawn with said spikes,
    collecting said leaves on said net,
    disposing said net and leaves in a container wherein said leaves are transformed into compost.

13. The method according to claim 12, said net being impregnated with a fertilizer.

14. The method according to claim 12, wherein said net is impregnated with a dethatching agent.

* * * * *